US012567444B2

(12) United States Patent
Springer

(10) Patent No.: US 12,567,444 B2
(45) Date of Patent: Mar. 3, 2026

(54) AUTOMATED VIDEO EDITING FOR A VIRTUAL CONFERENCE

(71) Applicant: Zoom Video Communications, Inc., San Jose, CA (US)

(72) Inventor: Shane Paul Springer, Manchester, MI (US)

(73) Assignee: Zoom Communications, Inc., San Jose, CA (US)

( * ) Notice: Subject to any disclaimer, the term of this patent is extended or adjusted under 35 U.S.C. 154(b) by 67 days.

(21) Appl. No.: 17/877,576

(22) Filed: Jul. 29, 2022

(65) Prior Publication Data

US 2024/0038272 A1      Feb. 1, 2024

(51) Int. Cl.
| | |
|---|---|
| *G06V 10/70* | (2022.01) |
| *G06V 20/40* | (2022.01) |
| *G10L 25/78* | (2013.01) |
| *G11B 27/031* | (2006.01) |
| *H04N 5/262* | (2006.01) |
| *H04N 5/76* | (2006.01) |

(52) U.S. Cl.
CPC ............ *G11B 27/031* (2013.01); *G06V 10/70* (2022.01); *G06V 20/49* (2022.01); *G10L 25/78* (2013.01); *H04N 5/2624* (2013.01); *H04N 5/76* (2013.01)

(58) Field of Classification Search
CPC ........ G06V 10/70; G06V 20/40; G10L 25/78; G11B 27/031; H04N 5/262; H04N 5/76
USPC ............... 386/278, 286, 285, 282, 239, 248
See application file for complete search history.

(56) References Cited

U.S. PATENT DOCUMENTS

| | | | |
|---|---|---|---|
| 10,897,637 B1 * | 1/2021 | Pham ............... | H04N 21/23406 |
| 2022/0353469 A1 * | 11/2022 | Huang ................. | G06F 40/279 |
| 2023/0300430 A1 * | 9/2023 | Mishra ........... | H04N 21/440236 |
| | | | 386/241 |
| 2023/0412411 A1 * | 12/2023 | VanBlon ................ | H04N 7/152 |

* cited by examiner

*Primary Examiner* — Daquan Zhao
(74) *Attorney, Agent, or Firm* — Kilpatrick Townsend & Stockton LLP

(57) ABSTRACT

In some aspects, techniques may include receiving media streams from one or more client devices. The media streams can be received by a virtual conference provider. Also, the techniques may include selecting a subset of the media streams based on one or more characteristics of the media streams. The streams may be selected using a machine learning (ML) model. In addition, the techniques may include identifying one or more segments of the subset of media streams satisfying an inclusion criteria. Moreover, the techniques may include generating a recording of the virtual conference including the one or more identified segments.

20 Claims, 9 Drawing Sheets

710 ⟿ RECEIVE MEDIA STREAMS FROM ONE OR MORE CLIENT DEVICES

720 ⟿ SELECT A SUBSET OF THE MEDIA STREAMS

730 ⟿ IDENTIFY SEGMENTS OF THE MEDIA STREAMS SATISFYING AN INCLUSION CRITERIA

740 ⟿ GENERATE A RECORDING OF THE VIDEO CONFERENCE

700

710 ~ RECEIVE MEDIA STREAMS FROM ONE OR MORE CLIENT DEVICES

720 ~ SELECT A SUBSET OF THE MEDIA STREAMS

730 ~ IDENTIFY SEGMENTS OF THE MEDIA STREAMS SATISFYING AN INCLUSION CRITERIA

740 ~ GENERATE A RECORDING OF THE VIDEO CONFERENCE

700

AUTOMATED VIDEO EDITING FOR A VIRTUAL CONFERENCE

FIELD

This disclosure generally relates to video conferencing, and more specifically relates to automated video editing for a virtual conference.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
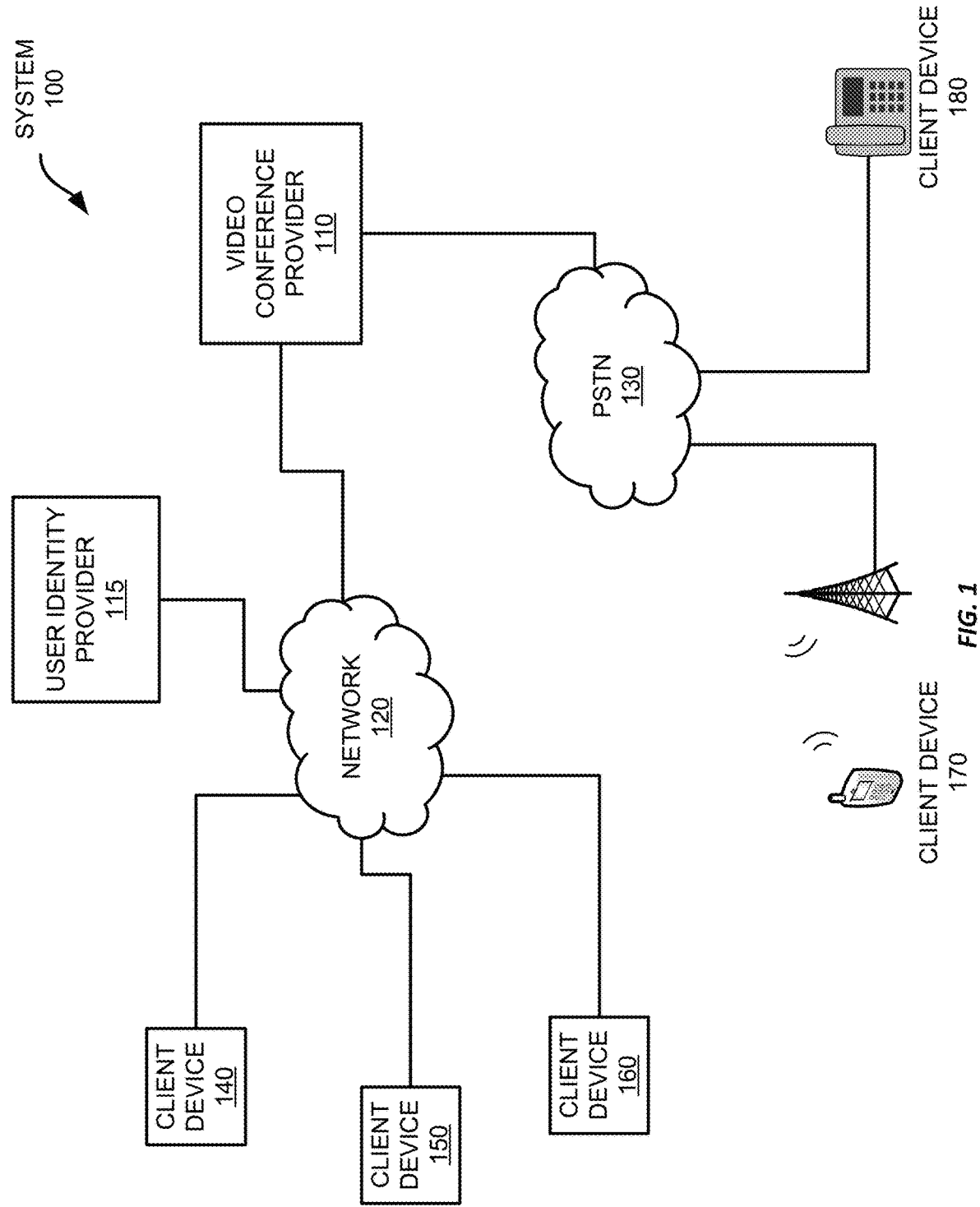
FIGS. 1-4 show example systems for editing media streams from virtual conferences.

Examples are described herein in the context of automated language identification during virtual conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During a virtual conference, participants may engage with each other to discuss any matters of interest. Typically such participants will interact in a virtual conference using a camera and microphone, which provides video and audio streams (each a "media" stream) that can be delivered to the other participants by the virtual conference provider and be displayed via the various client devices' displays or speakers.

Participants in a virtual conference may wish to record a conference for a number of reasons. For instance, a work meeting may be recorded to create a record of the discussion, and a virtual piano recital may be recorded for nostalgic reasons. A raw and unedited conference recording can contain awkward pauses, technical problems, and other issues that a participant may wish to remove through editing. Participants may want an edited video but the participants may not have access to the necessary editing software. Additionally, a video conference provider may not know how to edit a video or have the time to edit a video. However, a virtual conference provider can use machine learning (ML) models to automatically produce an edited video. The provider can use a selection process to choose media streams for the edited video. An identification process can identify clips (e.g., segments) from the media streams, and an editing process can combine the clips to generate an edited video.

The video conference participants can record the virtual conference in response to a user request. A recording of the virtual conference can be requested from the virtual conference provider via a graphical user interface (GUI) operating on a client device. In response to the recording request, a notification can be provided to the other meeting participants to indicate that a recording has begun or will begin shortly. The notification can allow participants who do not wish to be recorded to take appropriate action such as turning off video feeds, muting audio feeds, or leaving the virtual conference. After, or during, the video conference, the video conference provider can edit the recording to produce an edited video. At the end of the conference, the participant may receive an edited video in a short amount of time without the need for specialized knowledge or editing software.

The recording of the video conference can be created by combining one or more of the media streams created by the client devices. Once the edited video is completed, the recording can be accessed from the virtual conference provider using a client device, and the recording can include some or all of the media streams from the virtual conference. The virtual conference provider can use one or more machine learning (ML) models to edit the recording with minimal, or no, input from the participants. For instance, a ML model in the provider's selection process can select media streams that are included in the recording. Characteristics of the media streams, such as a topic being discussed during an audio stream, can be used by the selection process to select media streams. The selection process can select media feeds during a video conference before the conference has ended. The selection process can use a machine learning model, or a rules based approach, to select appropriate media streams. Some or all of a media stream can be selected and, a client device can create multiple media streams such as a video stream and an audio stream.

A machine learning model, or a rules based approach, may be used to divide media streams into segments and then select which segments to include in a generated recording based on inclusion criteria. Segmenting a media stream may include defining the limits of one or more clips from a media stream (e.g., designating a start time and an end time for one or more segments of the stream). Clips, or segments, can have variable lengths; for example, the previous clip can end and a new clip can begin when there is a change in speakers (e.g., a new clip can begin when a participant begins to speak and the clip can end when the participant stops speaking). A machine learning model can be used to select a start time and an end time for one or more clips from a media stream. The clips can be selected during the video conference and before the conference has concluded.

The clips can be selected based on whether a user would want the clips in the finished video, and, for instance, the clips can be selected based on the clip's quality, which conference participants are featured in the clips, or a topic for the finished video. The identification process can use a rules based approach to identify clips (e.g., identify clips with a speaking participant and a signal to noise ratio above a threshold). The identification process can be implemented using a machine learning model. The model can generate a confidence score for each clip and clips with a confidence score above a threshold can be identified/selected. The confidence score can be a probability that the clip should be identified for a timeframe. The identification process may not select a clip for each selected media stream if no clip is above a confidence threshold. The editing process can shorten the recording by not selecting clips for media streams if the clips are not needed in the video. For example, a user may provide a topic for an edited video and the clips may not discuss the topic.

An editing process of the video conference provider can generate an edited video using the clips identified by the identification process. A selected clip can be shown one or more times during the course of the edited video. For instance, an audio clip containing a spoken topic for the video conference may be repeated at the beginning and end of the edited video. The editing process can select an order for the selected clips and the order may include presenting multiple clips simultaneously in the edited video. The clips may be presented in a graphical layout with one or more video stream clips (e.g., video stream segments) shown concurrently according to the layout.

In addition, the editing process can apply filters to selected clips. The filters can include video or audio filters that can improve video quality or improve audio quality. The filters may achieve a desired effect that may not include changes to the video or image quality. For example, the filters may change video to black and white or a change the tone of a participant's voice. The filters can include augmented reality filters that superimpose computer generated graphics onto real objects or people in the clips. For example, an augmented reality filter can superimpose birthday hats onto participants in a clip. The filters may change the background in a clip such as blurring the background behind a participant. A model used to implement the editing process can calculate a confidence score for each filter, and a filter with a confidence score that is above a threshold can be applied to the model. A confidence score can be a probability that the clip should be selected for a timeframe. The edited video can be produced during a video conference and provided to the participant requesting the recording at the end of the conference.

These techniques can be used by a video conference provider to produce an edited recording. The recording can be presented to the participant requesting the recording and the participant can configure the edited recording using a graphical user interface (GUI) running on a client device. The participant's changes to the edited recording can be used as training data to improve the one or more machine learning models used to produce the edited recording.

Producing an edited video of a virtual conference can be a time consuming process and that may require access to specialized software. To produce a video, someone who knows how to use the software may have to review and manually edit every media stream created during the conference to select content for the video. This process can take hours, and, if someone is hired to edit the video, the process can be expensive. An automated video editing system can produce an edited video in a short period of time with minimal human intervention. A participant in the video conference may be able to receive an edited video at the end of the conference.

This illustrative example is given to introduce the reader to the general subject matter discussed herein and the disclosure is not limited to this example. The following sections describe various additional non-limiting examples and examples of providing edited video conference recordings.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity. In some instances, video conference provider 110 may provide a user profile language to video conference provider 210.

Figure 2:
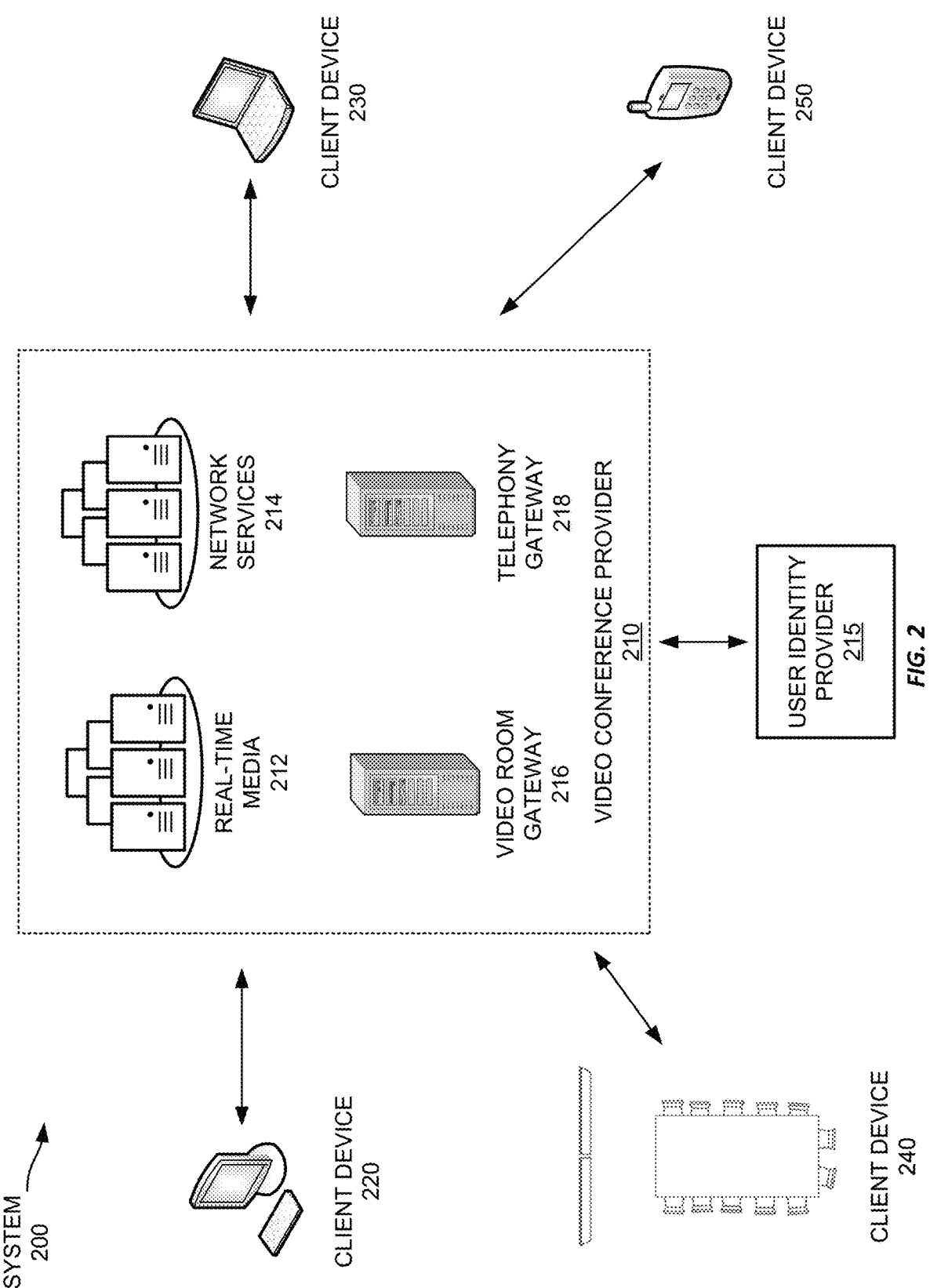

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, a meeting language, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively. The user identify provider 115 may provide a user profile language to the video conference provider 110.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where media streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted media streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt media content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt media streams. Thus, while encrypting the media streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed media streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing. In some instances, the media stream may contain metadata indicating a language for the media stream or the client devices 220-250. The language may be a device language provided by software on the client device or a language selected by a user of the client device via a graphical user interface (GUI).

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives media streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing media streams, the real-time media servers 212 may also decrypt incoming media stream in some examples. As discussed above, media streams may be encrypted between the client devices 220-250 and the video conference system 210. In some such examples, the real-time media servers 212 may decrypt incoming media streams, multiplex the media streams appropriately for the various clients, and encrypt the multiplexed streams for transmission.

In some examples, to provide multiplexed streams, the video conference provider 210 may receive media streams from the various participants and publish those streams to the various participants to subscribe to and receive. Thus, the video conference provider 210 notifies a client device, e.g., client device 220, about various media streams available from the other client devices 230-250, and the client device 220 can select which media stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted media streams at a user's request. For example, the meeting host may be able to request that the meeting be recorded or that a transcript of the audio streams be prepared, which may then be performed by the real-time media servers 212 using the decrypted media streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted media streams at the video conference provider, such as monitoring video or audio quality, adjusting or changing media encoding mechanisms, etc.

It should be appreciated that multiple real-time media servers 212 may be involved in communicating data for a single meeting and media streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive media streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing media streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 220-250 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, a meeting language, a source language or a target language for translation, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving media streams. In some instances, the real-time media servers 212 may store a source language, target language, user profile language, meeting language, or identified language for the media streams sent and received by the server.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle media streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive media streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
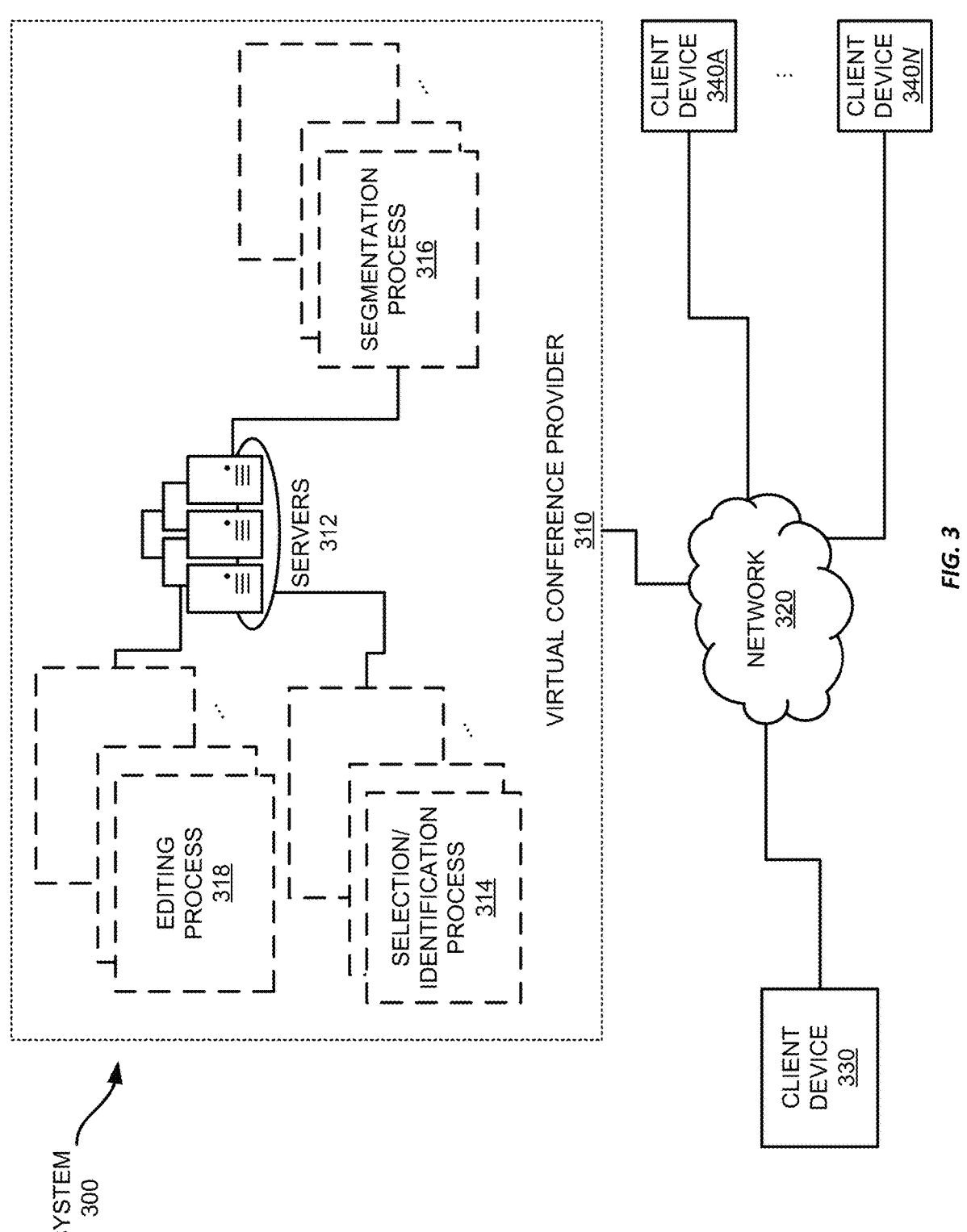

Referring now to FIG. 3, FIG. 3 shows an example system 300 for recording, segmenting, and editing for video conference streams. The system 300 includes a virtual conference provider 310, which can be connected to multiple client device 330, 340a-n via one or more intervening communication networks 320. In this example, the communications network 320 is the internet, however, any suitable communications network or combination of communications network may be employed, including LANs (e.g., within a corporate private LAN), WANs, etc.

Each client device 330, 340a-n executes virtual conference software, which connects to the virtual conference provider 310 and joins a meeting. During the meeting, the various participants (using virtual conference software or "client software" at their respective client devices 330, 340a-n) are able to interact with each other to conduct the meeting, such as by viewing video feeds and hearing audio feeds from other participants, and by capturing and transmitting video and audio of themselves (e.g., media streams).

Client devices 330, 340a-n may join virtual conferences hosted by the virtual conference provider 310 by connecting to the virtual conferences provider and joining a desired virtual conference, generally as discussed above with respect to FIGS. 1-2. Once the participants have joined the conference, they may interact with each other in real time by exchanging audio and video feeds (e.g., media streams). However, the participants may wish to record the conference for many reasons including, for instance, to allow the meeting to be shared with persons who could not attend the live conference.

The virtual conference provider 310 operates a number of servers 312 that can provide recording, segmentation, and editing functionality for media streams received from client devices 330, 340a-n. Recording functionality is provided by one or more selection/identification processes 314 that can be executed and allocated to virtual conferences hosted by the virtual conference provider 310. Similarly, segmentation functionality is provided by one or more segmentation processes 316 that can be executed and allocated to virtual conferences hosted by the virtual conference provider 310. In addition, editing functionality is provided by one or more editing processes 318 that can be executed and allocated to virtual conferences hosted by virtual conference provider 310.

The virtual conference provider 310 allocates one or more segmentation processes 316. Each segmentation process 316 is configured to segment each media stream into a number of segments. Segmenting a media stream can include identifying shorter clips (e.g., sequences of recorded audio or video) corresponding to a timeframe.

The segmentation process 316 can divide media streams into segments/clips without considering the content of the media streams. For example, the media streams can be divided into a sequence of segments corresponding to 30 second timeframes. In one configuration, a conference participant may select the length of segments via a user interface (UI) on a client device 330, 340a-n. In another configuration, the length of segments may be automatically determined by the virtual conference provider 310. The segmentation process 316 can divide media streams into segments corresponding to timeframes that vary based on the media stream's content. For example, the timeframe lengths can be longer while a client device is sharing the device's screen and the timeframes can be shorter while multiple conference participants are talking simultaneously. Segmenting a clip can include designating a start time and an end time for the clip.

To request recording services, a participant may select an option within their client software to enable recording. The selection can cause the client software to provide a visual or audio notification that the conference is being recorded. The client software can send a request to the virtual conference provider 310 for the selected recording services. After receiving a request for recording services, the virtual conference provider 310 can allocate one or more selection/identification processes 314 to the virtual conference. The selection/identification process 314 can select which media streams from client devices 330, 340a-n should be part of a generated recording. A video conference can include any number of streams exchanged between the participants. For example, a video conference may include only a few streams, e.g., 1-4, for a conference that includes two participants. However, larger conferences may include hundreds or thousands of participants, and thus may have hundreds or thousands of streams. For example, with one video stream and one audio stream per participant, selecting streams for an hour long video conference with 100 participants could include reviewing more than 200 streams with a total of 200 hours of footage. The selection/identification process may be able to review and select stream segments during the video conference without a lengthy selection process after the conference has concluded.

Media streams can be selected based on one or more audio stream parameters, video stream parameters, or profile parameters. Audio stream parameters can be parameters that are used to select audio streams. Some audio stream parameters can include audio quality, whether the audio stream includes detected speech (e.g., speech identified using natural language processing (NLP) techniques), the number of questions asked in the audio stream, the number of answers provided in the audio stream, the frequency that specified words/phrases occur in the audio feed, the percentage of the recording that an audio stream is active, the average length of each instance that an audio steam is active, or the number of times an audio stream is active. Video stream parameters can be parameters that are used to select video streams. Some video stream parameters can include video quality, the number of participants in a video stream (e.g., the number of different faces identified by a face detection algorithm), the average number of participants in a video stream, the amount of movement in a video stream, percentage of the recording that a video stream is active, the average length of each instance that a video steam is active, or the number of times a video stream is active. Profile parameters for a profile associated with a media stream can be used as parameters to select media streams. Some profile parameters can include the permissions level (e.g., host, guest) for the account, whether the account shares a video feed showing a client device's screen, whether a name associated with the account is mentioned in an audio stream (e.g., identified using NLP techniques), or whether a name associated with the account can be identified in a video stream (e.g., identified using optical character recognition (OCR) techniques).

For example, segments corresponding to a media stream from a client device with a video feed and an audio feed that is muted for the duration of the conference may not be selected for the recording. Alternatively, segments corresponding to a media stream for a conference attendee who talks throughout the conference may be selected for the recording. NLP techniques can identify whether a segment of an audio feed contains questions or answers which may indicate that the segment should be selected for the recording. OCR techniques can be used to identify names in a presentation shown in a video feed, and, for instance, segments corresponding to media streams from a profile associated with the names may be selected for the recording. The selection/identification process 314 may select a segment corresponding to a stream from a client device that is sharing a video feed showing the device's screen during the conference (e.g., sharing a presentation). The audio stream, the video stream, or the media stream may be recorded for a client device. The recording can last for the entire duration of the conference, a portion of the conference or multiple nonconsecutive portions of the conference. For example, the recording for a client device can include several nonconsecutive recordings of different times when the person controlling the client device is speaking.

The selection/identification process 314 can select segments provided by the segmentation process 316 that satisfy inclusion criteria. The inclusion criteria may define minimum audio or visual characteristics of segments selected for inclusion in a generated recording, such as a signal to noise threshold. For instance, a segment may not be selected to be part of a generated recording if the signal to noise ratio for the segment is below a signal to noise threshold.

The inclusion criteria can include audio characteristics such as the topic of conversation in a segment. A topic for the generated recording can be provided to the virtual conference provider 310 via a user interface (UI). The selection/identification process 314 can use natural language processing (NLP) techniques to identify topics (e.g., subject matter of speech) detected in the audio segments. A segment can be selected (e.g., identified) for inclusion in the recording if the clip contains speech related to the topic. Audio characteristics can include whether the selected segment(s) form a coherent narrative. NLP techniques can be used to analyze the speech in audio segments and these segments may be selected to construct a coherent narrative. For instance, a first segment may be selected because it includes a question, and a second segment that contains an answer responding to the question may also be selected.

Audio characteristics can include characteristics of speech detected in segments. The selection/identification process 314 can detect speech within a segment, and segments can be identified or selected if the segment (e.g., clip) contains speech. Segments containing silence or verbal pauses may kept out of the generated recording or the segments may be edited to remove the silence and the verbal pauses as part of generating the recording.

Profile characteristics can be used as inclusion criteria by the selection/identification process 314 to select (e.g., identify) segments. A clip may be identified if the clip is related to another clip that is selected (e.g., a video stream clip associated with a user profile may be selected if the audio clip associated with the profile is selected). A clip can be related to another clip if there is a relationship between the two clips. For instance, an audio clip and a video stream clip created by the same client device can have a relationship. There can be relationships between multiple audio clips containing recorded speech discussing a topic. The inclusion criteria may also include visual characteristics. Clips can be selected using visual emotion recognition techniques and, for instance, clips may be selected if emotions are detected in a participant's speech or facial expression. Visual attention detection techniques can be used to select video stream clips with participants that are paying attention to the conference.

The identified clips can be provided to editing process 318 and the editing process 318 can select a layout for the selected clips. For instance, a video stream of a conference participant who is speaking may be placed in a central position while video clips of participants who are not speaking can be placed on the periphery. The layout selected by the editing process 318 can be based on how the participant configures the layout during the conference. A video conference participant, during the video conference, can configure a layout for the video feeds from the other client devices 330, 340a-n. The editing process 318 can use the configured layouts to select a layout for the edited video. For instance, if multiple client devices 330, 340a-n place a particular video feed in a central position in the configured layouts, then the editing process 318 may place clips from the same video feed in prominent positions in the generated recording.

The size and aspect ratio for a clip can be altered by the editing process 318. For instance, facial recognition techniques can be used to identify the conference participants in the clips. The size or aspect ratio of the clips can be changed to resize the clip so that a participant's face is centered within the clip. In some embodiments, a clip can be divided and portions of the clip can be shown in different positions in the layout of the edited video. For instance, individual faces from multiple conference participants shown in a clip can be arranged side by side in the layout of the edited video. Virtual backgrounds used by attendees may also be removed or adjusted in the generated recording to provide continuity across different attendees.

Once the virtual conference has concluded, the virtual conference provider 310 can de-allocate the allocated segmentation, selection/identification, and editing processes 314, 316, 318 from the virtual conference and return them to the pool of available but idle segmentation, selection/identification, and editing processes 318, 314, 316, making them available to be allocated to other virtual conferences or for termination if the virtual conference provider 310 determines it has too many idle segmentation, selection/identification, or editing processes 314, 316, 318. In some embodiments, the segmentation, selection/identification, or editing processes 314, 316, 318 can perform their functions after the video conference has concluded. For instance, a recording of all media streams generated from a video conference can be provided to the segmentation process 316 which can divide the streams into segments. The selection/identification process 314 can then select individual segments to be part of the generated recording. The segments can be provided to the editing process 318 which can use the clips to generate an edited video.

Figure 4:
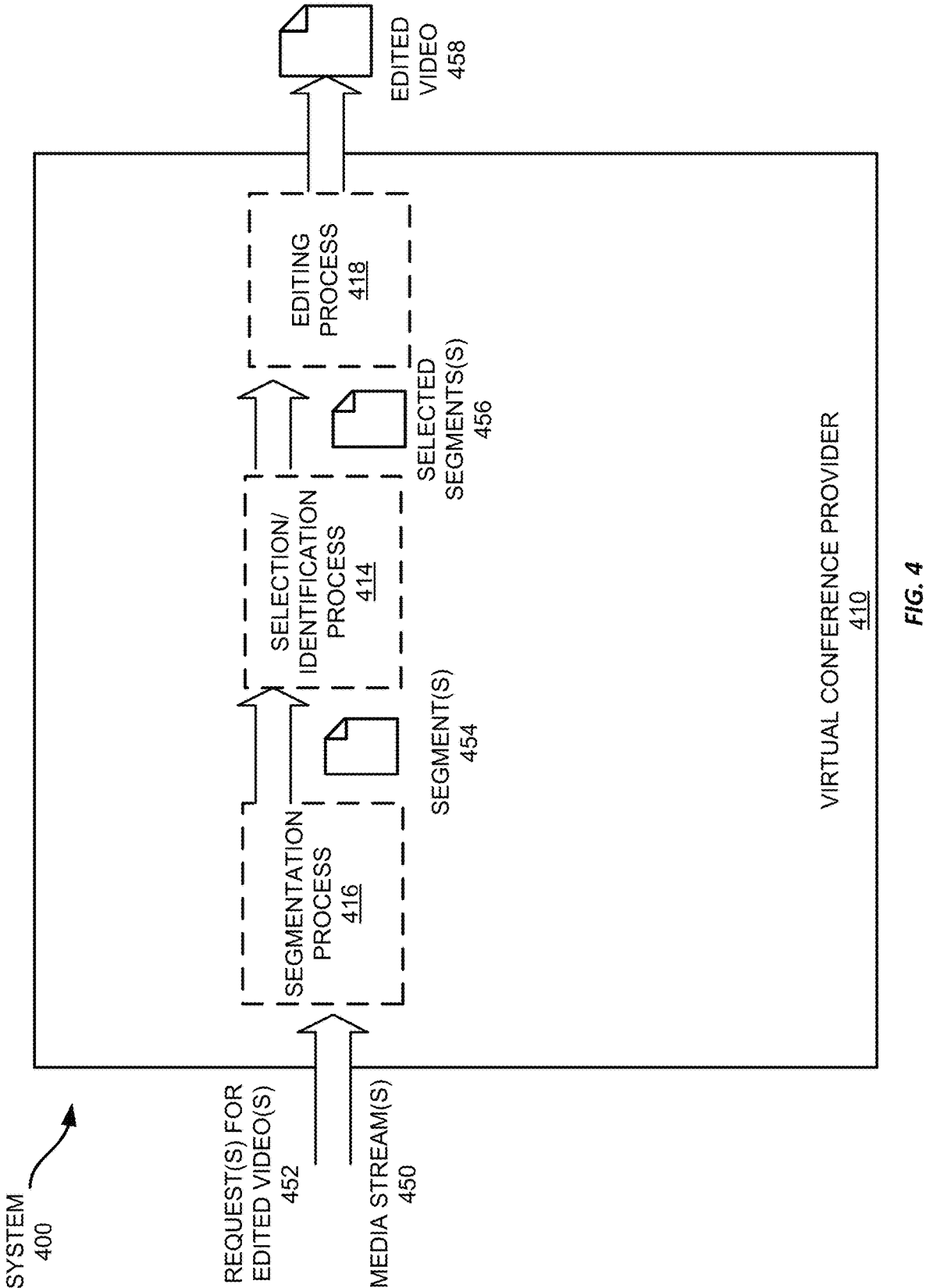

Referring now to FIG. 4, FIG. 4 shows an example data flow diagram for a system that provides automated video editing for virtual conferences. The system includes a virtual conference provider 410 that is hosting a virtual conference between multiple client devices, such as client devices 330, 340*a-n*. The virtual conference provider 410 has received a request to provide an edited video for a conference. During the virtual conference, the virtual conference provider 410 receives media streams 450 from the various client devices and one or more request(s) to create an edited video for the conference (e.g., request(s) for edited videos 452).

The media stream(s) 450 are provided to a segmentation process 416, which generates segments 454 that comprise some or all of the media stream(s) 450. The segmentation process 416 can divide the stream(s) into segments 454 by designating a start time and a stop time for a segment 454. The segments 454 can each have the same length, and, for instance the streams for a 5-minute conference can be divided into ten 30 second segments 454. The segments 454 can have variable lengths, and, for instance, the streams for a 5 min conference can be divided into six 5-second segments 454, one 30 second segment 454, and four 60 second segments 454. The segment length can be specified by a user as part of the request(s) for edited videos 452, or the segment length can be determined by the segmentation process 416 based on the content of the streams. The segmentation process 416 can select segments based on changes in the speaker during the media streams. The segmentation process 416 can also select segments (e.g., select the start time and end time of a segment 454) based on changes in the topic of conversation in audio streams (e.g., natural language processing (NLP) topic analysis techniques).

The segments 454 are then provided to one or more allocated selection/identification processes 414. The segments can be selected using a machine learning (ML) model that has been trained to select segments based on the audio stream parameters, video stream parameters, or profile parameters corresponding to each segment. As discussed above, the selected segments 456 may be generated in real-time, and the selected segments 456 may change during the course of the conference with segments 454 being added or removed from the set of selected segments 456. A media stream, such as media stream(s) 450, can comprise an audio stream, a video stream, or both. The selected segments 456 can comprise a video stream, without including a corresponding audio stream, and the selected segments 456 can comprise an audio stream without including a corresponding video stream.

Segments may be identified (e.g., selected) by the selection/identification process 414 based on their audio characteristics such as an analysis of conversations during the conference. The selection/identification process 414 can analyze the conversation using natural language processing (NLP) techniques, and audio segments may be selected if they form a coherent conversation. For instance, if a selected segment poses a question, as determined by a NLP machine learning model, a segment with an answer may also be selected. NLP topic analysis techniques can be used to select audio segments that relate to the same topic. Audio characteristics can include the quality of the audio segment, whether someone is speaking during the audio segment, whether the audio segment is active or muted during the timeframe associated with the segment, etc.

Video segments may be selected/identified in a media stream based on visual characteristics including video quality. The visual characteristics used by the selection/identification process 414 can include whether a participant can be detected in the video segment (e.g., using facial recognition techniques) or whether the video stream is inactive (e.g., the camera is turned off). Detected movement in a video segment can be a visual characteristic that is used by the selection/identification process 414 to select (e.g., identify) video segments. The visual characteristics can include the number of participants identified in a video segment.

The selection/identification process 414 can determine that none of the segments for a given media stream should be selected, and the generated recording/edited video 458 may have a shorter length than the length of the conference. Segments that contain redundant or unnecessary content may not be selected for the generated recording.

The selected segments 456 can be provided to editing process 418 so that the editing process can produce an edited video 458. Editing process 418 can receive selected segments 456 from the selection/identification process 414, and the process may adjust audio or video settings in the clips to improve the overall quality of the recording. Audio settings can include the speed, volume, bass, treble, and the direction (e.g., the relative volume of individual speakers) of the audio. Video settings can include the speed, brightness, frame rate, aspect ratio, and resolution of the video.

Generating an edited video 458 can mean that editing process 418 can select a graphical layout and an order for the selected segments 456. A graphical layout can display one or more segments from video stream(s) simultaneously. The editing process 418 can determine a position, and a size, for video segments displayed in the graphical layout. One or more orders for the selected segments 456 can be selected by the editing process 418. The one or more orders can include a sequential order for the selected segments 456 that is similar to the order of the segments in the video conference. The one or more orders for the selected segments 456 can be based on the content of the segments such as an order based on topic. The order for the selected segments 456 can comprise concurrently aligning two or more segments.

Selected segments 456 can be presented sequentially or the segments can overlap with multiple segments presented in parallel.

Figure 5A:
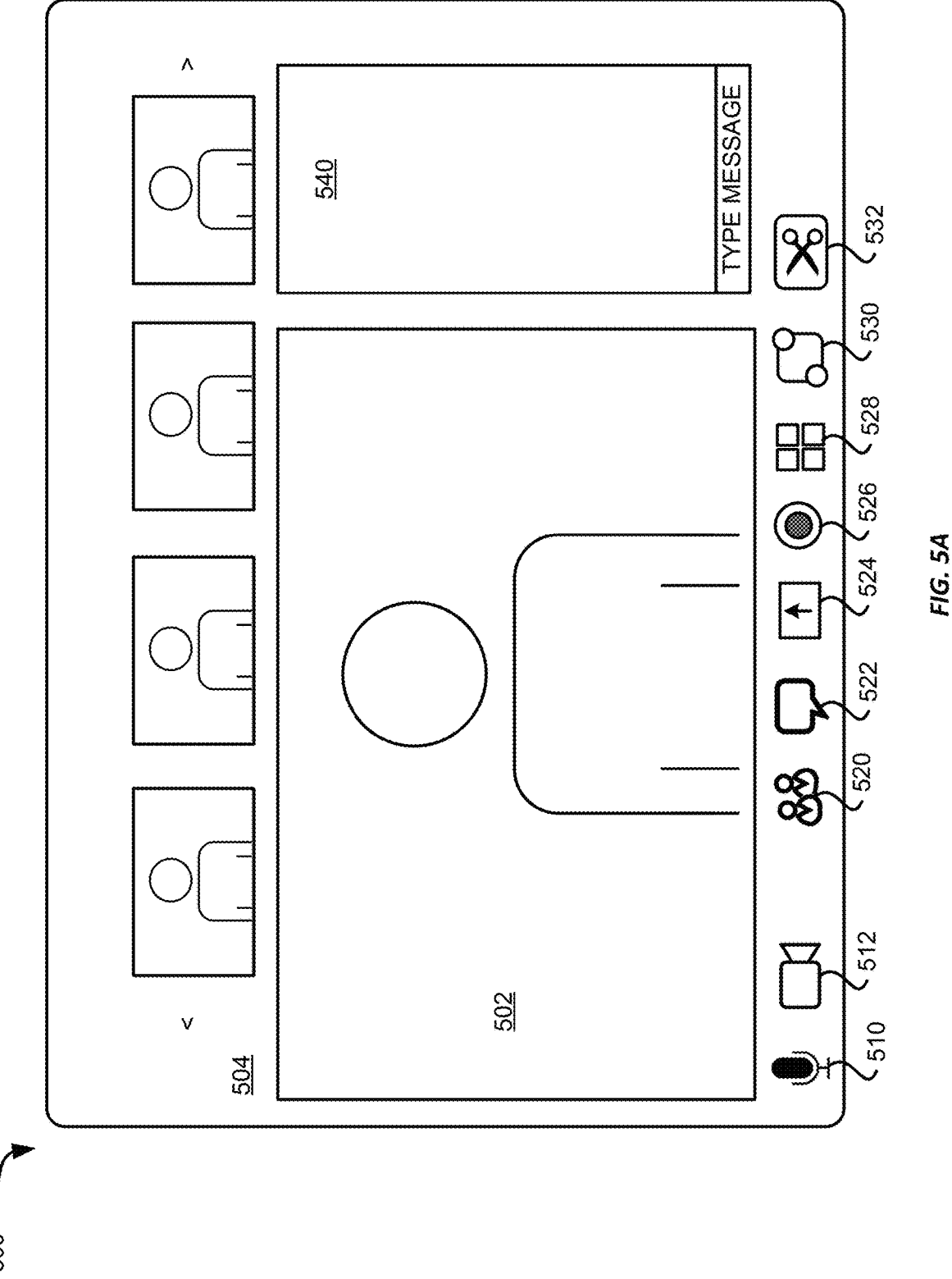
FIGS. 5A-5B show example graphical user interfaces ("GUIs") for editing media streams from virtual conferences.
Figure 5B:
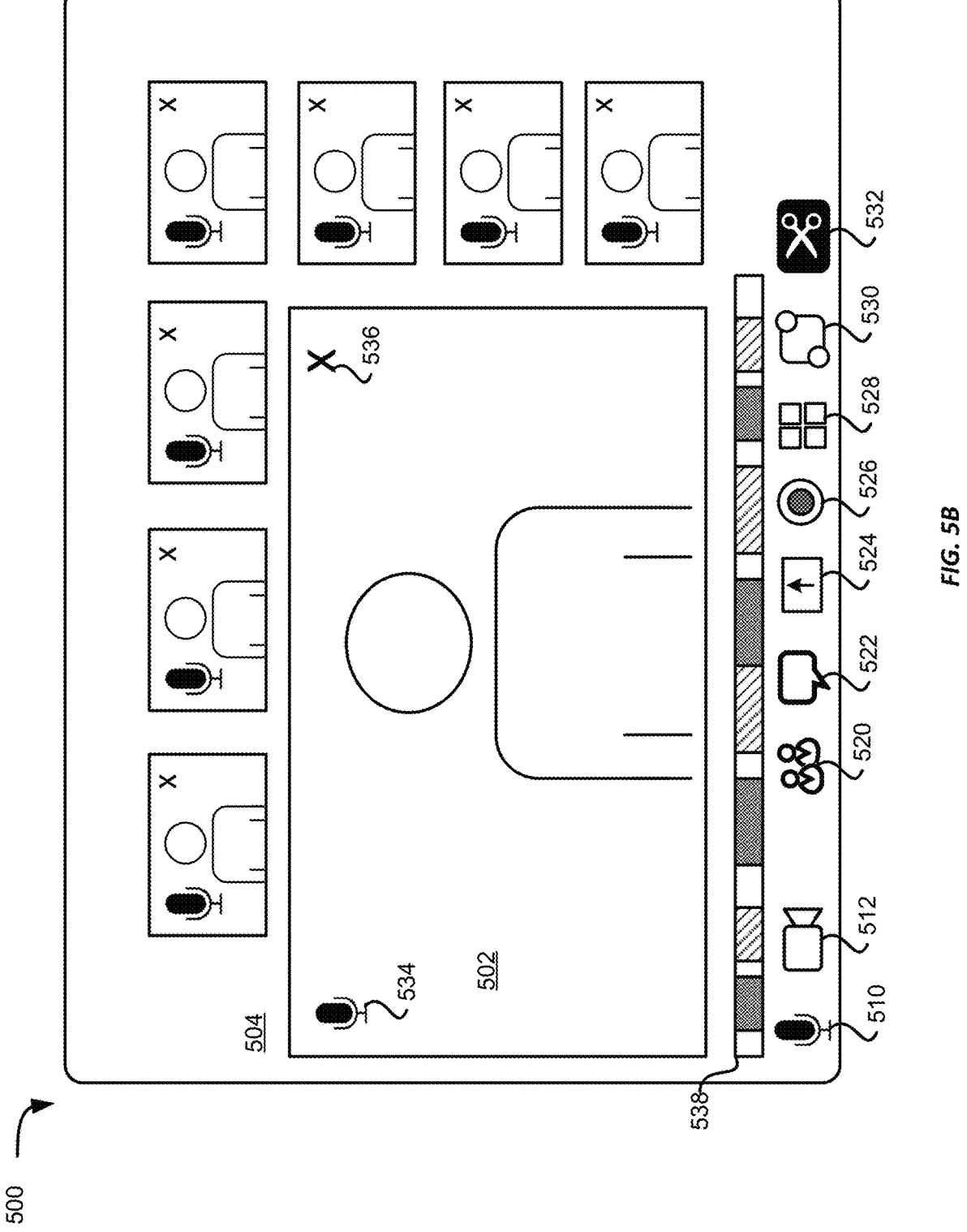

Referring now to FIGS. 5A-5B, FIG. 5A illustrates an example GUI 500 for a software client that can interact with a system for providing video editing of virtual conferences. A client device, e.g., client device 330 or client devices 340a-n, executes a software client as discussed above, which in turn displays the GUI 500 on the client device's display. In this example, the GUI 500 includes a speaker view window 502 that presents the current speaker in the video conference. Above the speaker view window 502 are smaller participant windows 504, which allow the participant to view some of the other participants in the video conference, as well as controls ("<" and ">") to let the host scroll to view other participants in the video conference. Editing process 418 can use information from the controls to determine which media streams to display in the edited video. For instance, if a particular media stream is selected by multiple users, then that media feed may be shown in the edited video. Information from the controls can also be used by selection/identification process 414 to select media streams that are recorded. On the right side of the GUI 500 is a chat window 540 within which the participants may exchange chat messages.

Beneath the speaker view window 502 are a number of interactive elements 510-530 to allow the participant to interact with the video conference software. Controls 510-512 may allow the participant to toggle on or off audio or video streams captured by a microphone or camera connected to the client device. Information about which streams are toggled on or off can inform which media streams are selected by selection/identification process 414 or how streams are arranged in the graphical layout of the edited video by the editing process 418. Control 520 allows the participant to view any other participants in the video conference with the participant, while control 522 allows the participant to send text messages to other participants, whether to specific participants or to the entire meeting. Control 524 allows the participant to share content from their client device. Control 526 allows the participant to toggle recording of the meeting which can cause the virtual conference provider 410 to allocate one or more of a segmentation process 416, a selection/identification process 414, or an editing process 418 to the video conference. Control 528 allows the user to select an option to join a breakout room. Control 530 allows a user to launch an app within the video conferencing software, such as to access content to share with other participants in the video conference. The editing button 532 can allow a user to access an editing overlay that can allow a user to modify or provide input to the edited video 458 produced by the editing process 418. The input provided through the editing overlay can be used to train machine learning models that can be used to implement the segmentation process 416, selection/identification process 414, or editing process 418.

FIG. 5B illustrates the GUI 500 after the user has pressed the editing button 532, which has darkened to indicate the editing functionality is active. The video conference can be edited in real time or a recording can be edited after the video conference has concluded. In addition, a mute button 534 has been overlaid on participant windows within the conference who are providing an audio stream to the virtual conference service. In some examples, a user may interact with the mute button 534 to enable or disable audio streams. The speaker window can be moved, resized or altered using the editing functionality. In some examples, the speaker window 502 can be swapped with one of the smaller participant windows 504. A delete button 536 can be added to the speaker window 502 or the smaller participant windows. The layout of the windows can be altered by a user who can, for instance, click and drag the windows into the desired layout.

A video progress bar 538 can be used to navigate the recording and the layout can be configured at different times in the video. Video progress bar 538 can be used to identify clips in the video. The selection/identification process 414 can identify portions of the video, and the different patterns in progress bar 538 can correspond to different identified clips. The user can configure the clips provided by the selection/identification process 414 and the user's changes to the clips can be used to train a machine learning model used to implement the selection/identification process 414. A pattern, of the different patterns in progress bar 538, can represent an individual clips or the patterns can represent multiple clips. For example a pattern may represent a section of the recording that is subdivided into 20 second clips.

The segmentation process 416, selection/identification process 414, and editing process 418, can be implemented using one or more machine learning model(s). The machine learning model(s) can be a convolutional neural network (CNN), and, for instance, the recording process can be implemented with a CNN that is trained on training data including labeled media streams. The labeled media streams may be derived from customer input from the GUI 500 after the editing button has been pressed. For instance if a speaker window 502 or smaller participant window 504 is muted, then the corresponding audio stream, that was muted, can be labeled as "do not select." An audio stream that was unmuted can be labeled as "select." Similarly, the video streams corresponding to the speaker windows 502 and small participant windows 504 that are deleted using the delete button 536 can be labeled as "do not select" while the video streams corresponding to windows that were not deleted can be labeled as "select." The media streams can be manually labeled to create training data or labeled media streams can be obtained from other sources.

The selection/identification process 414 can be implemented with a machine learning model that can be trained to select appropriate clips. Changes in speakers during the video conference can be used to select clips. For example, the model can select from a variety of possible clips based on characteristics of the recording. For instance, short clips (e.g., 5 seconds) may be appropriate in a discussion where the speaker changes repeatedly between six participants in a short period of time. A longer clip (e.g., 90 seconds) may be appropriate during, for example, a discussion with two participants. The length of clips may change throughout the virtual conference, and, for example, a five minute clip may be appropriate during a presentation while a fifteen second clips may be appropriate for the post presentation question and answer session.

A machine learning model can be trained to implement the selection/identification process 414 using training data derived from GUI 500. For example, the model can present initial clips to a participant via video progress bar 538. The participant can alter the initial clips using video progress bar 538 and the altered timeframes can be used to produce training data. The initial clips can be training data that can be provided as input to an algorithm that is being trained to produce a machine learning model. The media streams can be the output from selection/identification process 414. The parameters of the algorithm can be altered until the algorithm is trained to generate the altered clips as output in response to the input (e.g., initial clips). The algorithm can be a trained model once the algorithm produces the correct output in response to the input. The initial clips can be a regular series of timeframes throughout the video (e.g., the video can be divided into a series of 30 second clips).

The editing process 418 can be implemented using a machine learning model. To train a machine learning model, an algorithm can receive training data comprising clips produced by the selection/identification process 414 as input to the algorithm. The output from the machine learning algorithm can be one or more orders for the input clips. A participant can use video progress bar 538 to select an order for the clips. Video progress bar 538 can comprise multiple video progress bars in some circumstances. For example, video progress bar 538 can include one audio progress bar for audio clips and two separate video progress bars for video clips. Multiple video progress bars can allow a user to select multiple orders for the clips. The clips can be the clips can be the input and the order of the clips can be the desired output. The parameters of the algorithm can be altered until the algorithm is trained to generate the order(s) for the clips as output in response to the input clips.

The editing process 418 can use a machine learning model that selects a layout for the clips. Video clips can be labeled with an x, y coordinates that show where the clip should be displayed in a layout of the edited video. The labeled coordinates can be based on the position of clips selected by participants using GUI 500. The parameters of the algorithm can be altered until, for a given clip, the algorithm selects the x, y coordinates chosen by the participant. An algorithm that selects the chosen x, y coordinates can be a trained machine learning model. The machine learning model can be trained to select an appropriate layout for clips that are provided as input to the model. For example, a participant can use GUI 500 to select a layout from a number of layouts. The participant can also select which clips are displayed in different portions of the layout. Clips can be provided to an algorithm and the algorithm's parameters can be altered until the algorithm selects the layout chosen by the participant.

An algorithm can be trained to select filters and the algorithm can receive clips as input. The desired output from the model can be one or more filters selected by a participant using GUI 500. The algorithm's parameters can be altered until the algorithm selects the filters chosen by the participant. An algorithm that selects the chosen filters can be a trained machine learning model. Clips can be labeled with a tuple with a length equal to the number of video or audio filters that the editing process 418 can apply to the clips. Other label configurations are contemplated.

To train the machine learning model, training data can be provided as input to the machine learning model. The machine learning model can output a classification (e.g., confidence score) for the input training data, and, during training, the model parameters can be modified until the output for the input training data matches the known output for the training data. For a neural network, the model parameters can be the total number of nodes, the number of nodes in a layer, the number of layers, and the weights for connections between nodes. Once the model properly classifies the training data, the model can be tested on verification data. The verification data can be audio segments (e.g., audio stream clips), from a known language, that were not used earlier in the training process. If the machine learning model correctly classifies the verification data, the machine learning model can be a trained machine learning model.

Examples of machine learning models include deep learning models, neural networks (e.g., deep learning neural networks), kernel-based regressions, adaptive basis regression or classification, Bayesian methods, ensemble methods, logistic regression and extensions, Gaussian processes, support vector machines (SVMs), a probabilistic model, and a probabilistic graphical model. Embodiments using neural networks can employ using wide and tensorized deep architectures, convolutional layers, dropout, various neural activations, and regularization steps.

Figure 6:
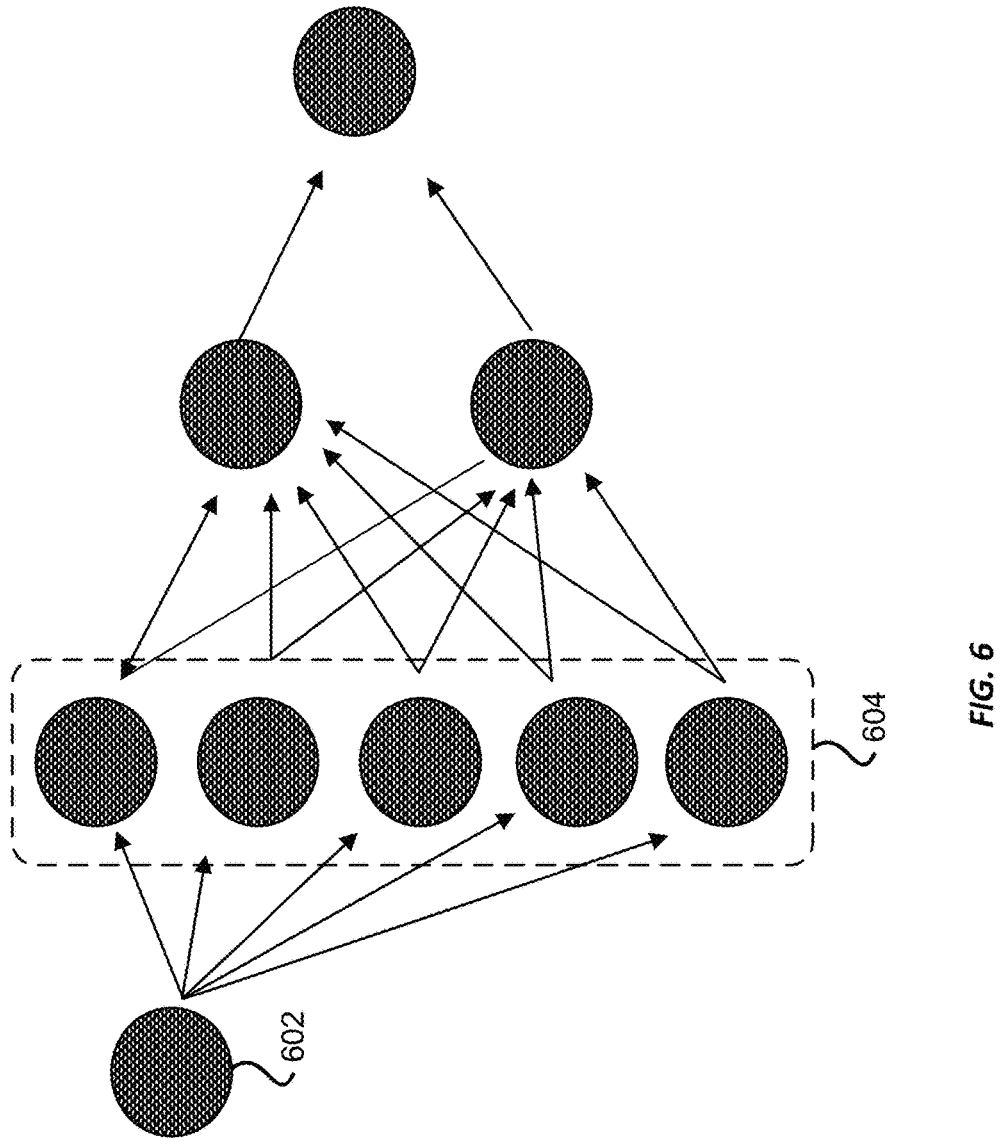
FIG. 6 shows an example machine learning (ML) model for editing media streams from virtual conferences.
Figure 6:

FIG. 6 shows an example machine learning model of a neural network. As an example, the language identification process can provide translation using a neural network that comprises a number of neurons (e.g., neuron 602; Adaptive basis functions) organized in layers (e.g., layer 604). The training of the neural network can iteratively search for the best configuration of the parameters of the neural network for feature recognition and classification performance. Various numbers of layers and nodes may be used. A person with skills in the art can easily recognize variations in a neural network design and design of other machine learning models.

Figure 7:
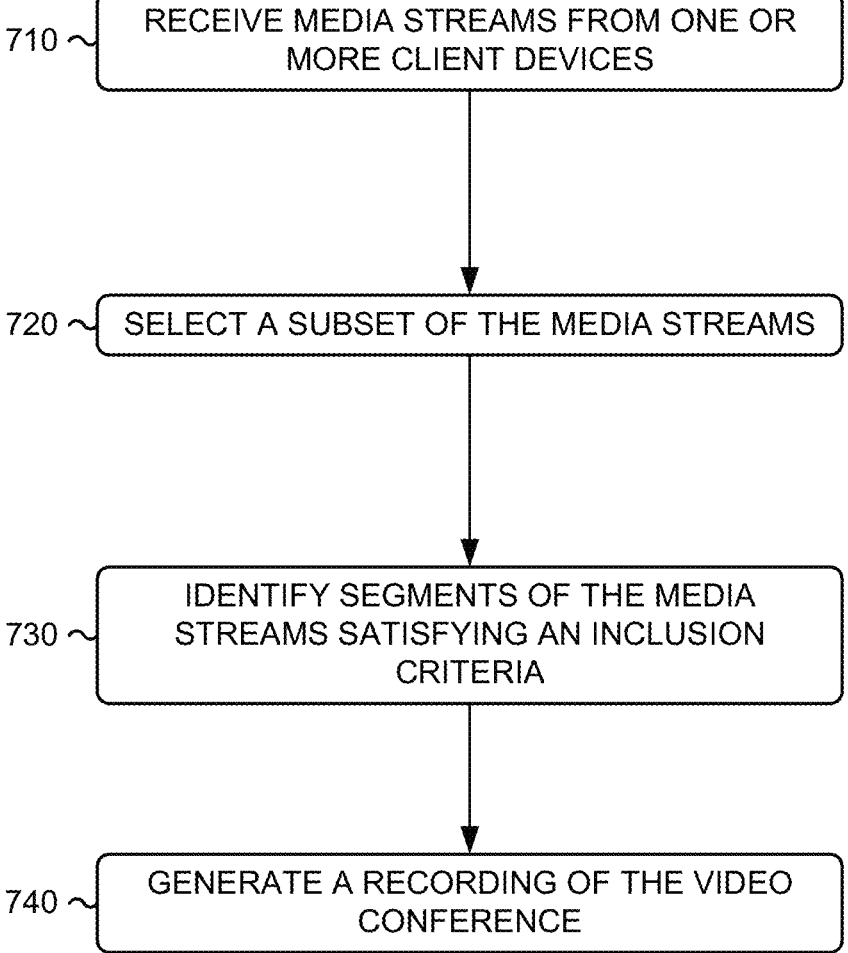
FIG. 7 shows an example method for editing media streams generated during virtual conferences.

Referring now to FIG. 7, FIG. 7 shows an example method 700 for automated video editing for a virtual conference. This example method 700 will be described with respect to the systems 100-400 shown in FIGS. 1-4, the example GUIs 500 shown in FIGS. 5A-5B, and the example machine learning model 600 shown in FIG. 6; however, any suitable systems or GUIs according to this disclosure may be employed.

At block 710, media streams can be received from one or more client devices. The media streams can be received by a virtual conference provider 210, 310, 410. The media streams can be generated by one or more client device(s) 140-180, 220-250, 330, 340*a-n* during a virtual conference. The media streams can be received via network(s) 120, 320.

At block 720, a subset of the media streams can be selected based on one or more characteristics of the media streams. The media streams can be media stream(s) 450 and the streams can be selected by selection/identification process 314, 414. The media streams can include video streams and audio streams. The video streams can be video feeds of one or more participants, a video feed of a screen share, or other content shared during the conference. The selection process can include at least one of a machine learning (ML) model or one or more rules. The media streams can be selected by a machine learning model. The streams can be selected using a machine learning model that has been trained to select streams based on the audio stream parameters, video stream parameters, or profile parameters. Selected segments 456 can include some or all of the media stream(s) 450, and segments can be selected based on a similarity between the selected segment and previously selected segments that were selected for previous edited recordings.

At block 730, one or more segments of the subset of media streams can be identified. The segments, or clips, can be identified if the segments satisfy inclusion criteria. The segments (e.g., clips) of the streams can be identified using a machine learning model that has been trained to select segments of streams based on the audio stream parameters, video stream parameters, or profile parameters. The inclusion criteria can include one or more of audio characteristics, video characteristics, or profile characteristics.

Not every stream will include selected segments for the generated recording. As discussed above, a segment can be identified by designating a start point and an end point in a stream. Multiple segments can overlap in a stream with the start point or end point for a first segment being located inside of a second segment. Identifying a segment can mean saving the segment as a file.

At block 740, a recording of the virtual conference can be generated. The recording can comprise the one or more identified segments. Editing process 418 can select a layout based on the clips (e.g., segments) identified by the identification process. For instance, the editing process 418 can select from a number of preconfigured layouts that have spaces where video clips can be displayed, and editing process 418 can select videos for the spaces. The clips may be arranged in the layout based on where a previous related clips were arranged in the layout. For instance, multiple clips featuring a particular conference participant may be shown in the same position in the layout. In some examples, editing process 418 may create a custom layout, and, for instance, the process can assign an x, y coordinate for each video clip that can correspond to the center of each clip. If audio clips but no video clips are selected for a timeframe, the editing process can select a layout with no spaces to display video clips, and, for example, the layout may display a transcript of the audio from the audio clips.

The clips, in the layouts selected by editing process 418, can be combined to produce an edited video. The clip(s) can be stitched together in a sequential or overlapping order by the editing process 418 to create edited video 458. In some situations, the clips can be combined based on a criteria other than the order that the clips appear in a stream, and, for instance the clips can be combined based on topic to create an edited video. The video clips may be combined in an order that does not correspond to the order for the audio clips, and audio clips may be combined in an order that does not correspond to the order for the video clips. Editing process 418 can select a video order for video clips and an audio order for audio clips. The video order, or audio order, may be selected based on topic or the participants featured in the clips. The layouts selected by editing process 418 can be combined by a computing device such as servers 312, client device 140-180, 220-250, 330, 340a-n, computing device 900 to produce an edited video 458.

The video editing process can include at least one of a machine learning (ML) model or one or more rules for editing video clips. The one or more machine learning models in the video editing process, or editing process 418, can include a filter model that is configured to select a filter for a clip, an order model that is configured to select one or more orders for the clips, or a layout model that is configured to arrange the clips in a layout. The editing process 418, can change the aspect ratio of selected video segments 456.

Figure 8:
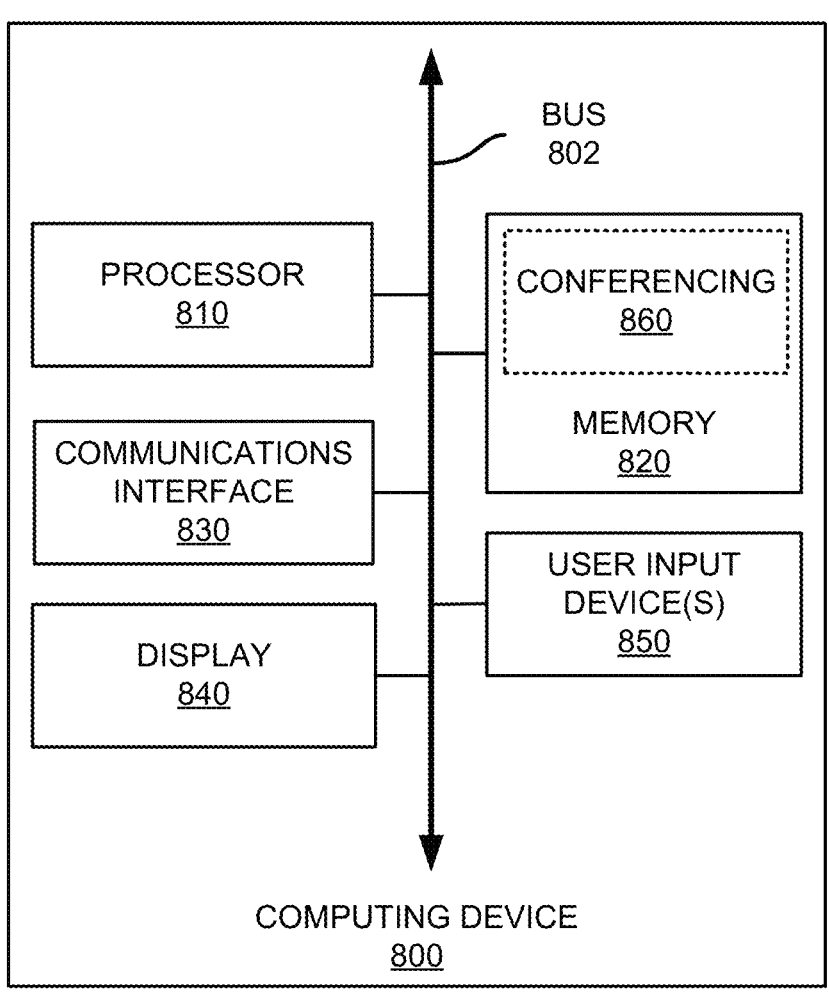
FIG. 8 shows an example computing device suitable for use with example systems and methods for editing media streams from virtual conferences.

Referring now to FIG. 8, FIG. 8 shows an example computing device 800 suitable for use in example systems or methods for automated video editing for a virtual conference according to this disclosure. The example computing device 800 includes a processor 810 which is in communication with the memory 820 and other components of the computing device 800 using one or more communications buses 802. The processor 810 is configured to execute processor-executable instructions stored in the memory 820 to perform one or more methods for automated video editing for a virtual conference according to different examples, such as part or all of the example method 700 described above with respect to FIG. 7. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes a video conferencing application 860 to enable a user to join and participate in one or more virtual spaces or in one or more conferences, such as a conventional conference or webinar, by receiving media streams from a video conference provider, sending media streams to the video conference provider, joining and leaving breakout rooms, creating video conference expos, etc., such as described throughout this disclosure, etc.

The computing device 800 also includes a communications interface 830. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

What is claimed is:

1. A method comprising:
receiving, by a virtual conference provider, a plurality of media streams from a plurality of client devices;
selecting a subset of the plurality of media streams for recording, the subset comprising less than all media streams of the plurality of media streams;
providing the selected subset of the plurality of media streams to a trained ML model;
identifying, using the trained ML model, one or more segments of the selected subset of the plurality of media streams satisfying an inclusion criteria; and
generating a recording of the virtual conference comprising the one or more identified segments.

2. The method of claim 1, wherein segments of the media streams satisfying the inclusion criteria comprise audio segments that include detected speech.

3. The method of claim 1, further comprising:
selecting a first subject matter for a first portion of the recording, wherein segments of the selected subset of the plurality of media streams satisfying the inclusion criteria for the first portion comprise audio segments that include detected speech relevant to the first subject matter; and
selecting a second subject matter for a second portion of the recording, wherein segments of the selected subset of the plurality of media streams satisfying the inclusion criteria for the second portion comprise audio segments that include detected speech relevant to the second subject matter.

4. The method of claim 1, wherein the inclusion criteria is based on selected segments for previously generated recordings.

5. The method of claim 1, wherein the inclusion criteria defines one or more quality metrics for a segment.

6. The method of claim 1, wherein the plurality of media streams comprises a plurality of audio streams and a plurality of video streams, and wherein the inclusion criteria defines one or more relationships between the audio and video streams.

7. The method of claim 1, wherein generating the recording comprises:
determining a graphical layout for video stream segments satisfying the inclusion criteria.

8. The method of claim 7, wherein multiple video stream segments are presented simultaneously according to the layout.

9. The method of claim 1, wherein generating the recording comprises:
determining an order for the one or more identified segments.

10. The method of claim 9, wherein the order comprises concurrently aligning two or more segments.

11. The method of claim 1, wherein generating the recording comprises adjusting audio and video settings for individual segments to improve the overall quality of the recording.

12. The method of claim 1, further comprising:
adjusting the ML model based on changes made to the recording by a user.

13. A system comprising:
a non-transitory computer-readable medium storing processor-executable program instructions; and
one or more processors communicatively coupled to the non-transitory computer-readable medium, the one or more processors configured to execute the processor-executable program instructions to:
receive, by a virtual conference provider, a plurality of media streams from a plurality of client devices;
selecting a subset of the plurality of media streams for recording, the subset comprising less than all media streams of the plurality of media streams;
provide the selected subset of the plurality of media streams to a trained ML model;
identify, using the trained ML model, one or more segments of the selected subset of the plurality of media streams satisfying an inclusion criteria; and
generate a recording of the virtual conference comprising the one or more identified segments.

14. The system of claim 13, wherein segments of the subset of the plurality of media streams satisfying the inclusion criteria comprise audio segments that include detected speech.

15. The system of claim 13, wherein one or more processors are configured to execute further processor-executable program instructions stored in the non-transitory computer-readable medium to:
select a first subject matter for a first portion of the recording, wherein segments of the selected subset of the plurality of media streams satisfying the inclusion criteria for the first portion comprise audio segments that include detected speech relevant to the first subject matter; and
select a second subject matter for a second portion of the recording, wherein segments of the selected subset of the plurality of media streams satisfying the inclusion criteria for the second portion comprise audio segments that include detected speech relevant to the second subject matter.

16. The system of claim 13, wherein the inclusion criteria is based on selected segments for previously generated recordings.

17. A non-transitory computer-readable storage medium storing processor-executable program instructions, wherein when executed by a processing device, the processor-executable program instructions cause the processing device to:
receive, by a virtual conference provider, a plurality of media streams from a plurality of client devices;

select a subset of the plurality of media streams for recording, the subset comprising less than all media streams of the plurality of media streams;

provide the selected subset of the plurality of media streams to a trained ML model;

identify, using the trained ML model, one or more segments of the selected subset of the plurality of media streams satisfying an inclusion criteria; and generate a recording of the virtual conference comprising the one or more identified segments.

18. The medium of claim 17, wherein the inclusion criteria defines one or more quality metrics for a segment.

19. The medium of claim 17, wherein the plurality of media streams comprises a plurality of audio streams and a plurality of video streams, and wherein the inclusion criteria defines one or more relationships between the audio and video streams.

20. The medium of claim 17, further comprising processor-executable program instructions configured to cause the processing device to:

determine a graphical layout for video stream segments satisfying the inclusion criteria.

\* \* \* \* \*